US011144588B2

(12) United States Patent
Zimmerman et al.

(10) Patent No.: US 11,144,588 B2
(45) Date of Patent: Oct. 12, 2021

(54) DETERMINING AND UTILIZING ACTUAL PURPOSE OF USER-ASSEMBLED COLLECTION OF ELECTRONIC CONTENT ITEMS

(71) Applicant: Google LLC, Mountain View, CA (US)

(72) Inventors: Jared Zimmerman, Belmont, CA (US); Stevi McBrian, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 131 days.

(21) Appl. No.: 16/526,398

(22) Filed: Jul. 30, 2019

(65) Prior Publication Data
US 2021/0034659 A1 Feb. 4, 2021

(51) Int. Cl.
G06F 16/55 (2019.01)
G06F 16/51 (2019.01)
G06F 16/535 (2019.01)
G06F 16/58 (2019.01)
G06N 20/00 (2019.01)

(52) U.S. Cl.
CPC ............ G06F 16/55 (2019.01); G06F 16/51 (2019.01); G06F 16/535 (2019.01); G06F 16/5866 (2019.01); G06N 20/00 (2019.01)

(58) Field of Classification Search
CPC .................................................. G06F 16/9536
See application file for complete search history.

(56) References Cited

U.S. PATENT DOCUMENTS

| 7,398,231 | B2* | 7/2008 | Wan ..................... G06Q 10/087 705/26.7 |
| 8,935,264 | B2* | 1/2015 | Braham ............ G06F 16/24578 707/749 |
| 2012/0059708 | A1 | 3/2012 | Galas et al. |
| 2013/0218818 | A1 | 8/2013 | Phillips |
| 2014/0040274 | A1* | 2/2014 | Aravamudan ...... G06F 16/3322 707/741 |
| 2018/0095957 | A1* | 4/2018 | Mishne ................... G06F 16/93 |

OTHER PUBLICATIONS

Ramesh, N. et al., "Outfit Recommender System;" 2018 IEEE/ACM International Conference on Advances in Social Networks Analysis and Mining (ASONAM); pp. 903-910; Aug. 28, 2018.
European Patent Office; International Search Report and Written Opinion of PCT Ser. No. PCT/US2020/043491; 13 pages; dated Sep. 18, 2020.

* cited by examiner

Primary Examiner — William Spieler
(74) Attorney, Agent, or Firm — Middleton Reutlinger

(57) ABSTRACT

Implementations are described for determining, based on a user-assembled collection of electronic content items, at least one actual purpose for the assembled collection. Those implementations are further directed to selecting an additional electronic content item based on the at least one actual purpose being assigned to the additional electronic content item in an electronic database. Those implementations are yet further directed to, responsive to the selecting, causing a suggestion for the additional electronic content item to be rendered at a client device associated with a user account that is assigned to the user-assembled collection.

18 Claims, 7 Drawing Sheets

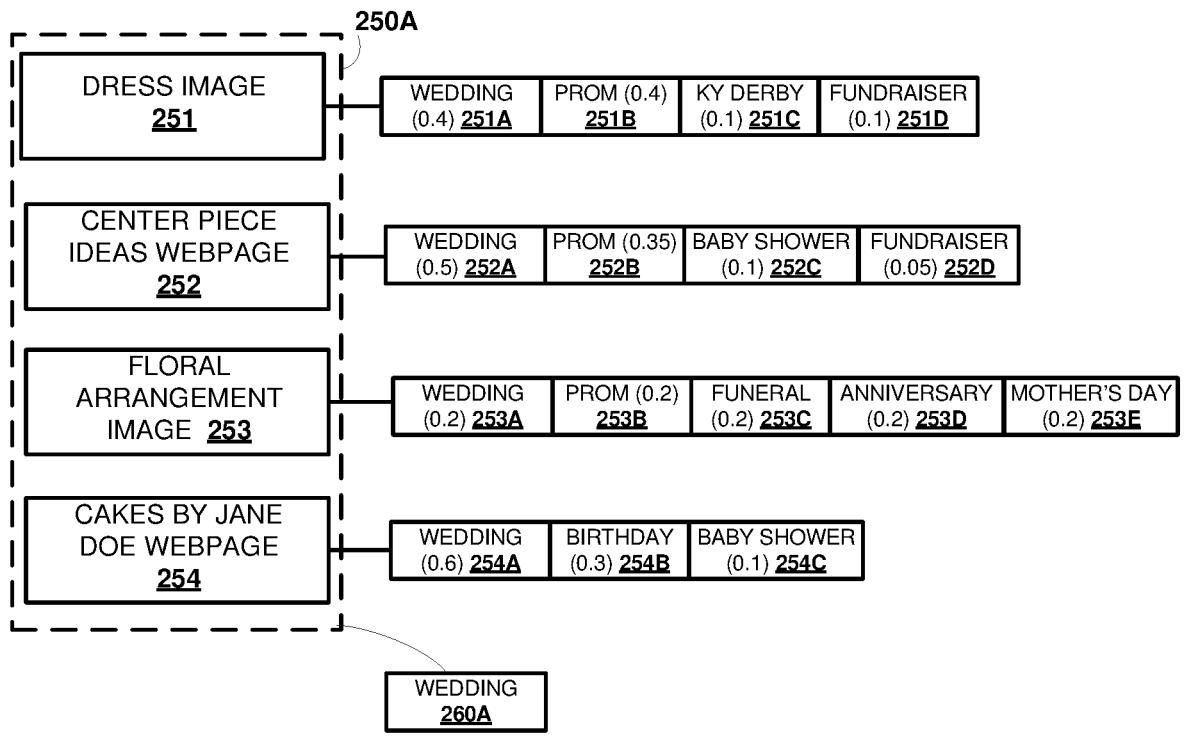
FIG. 2A1
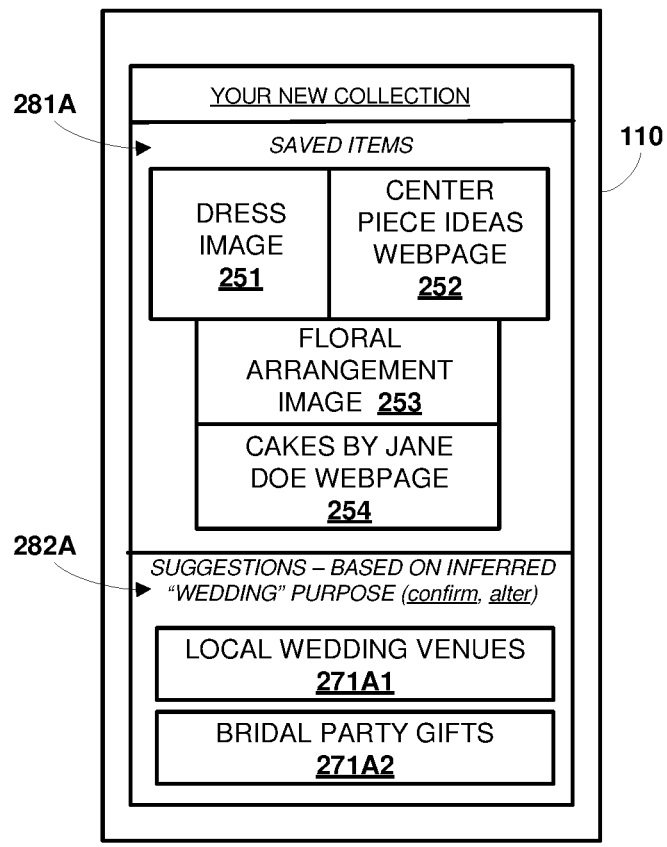
FIG. 2A2

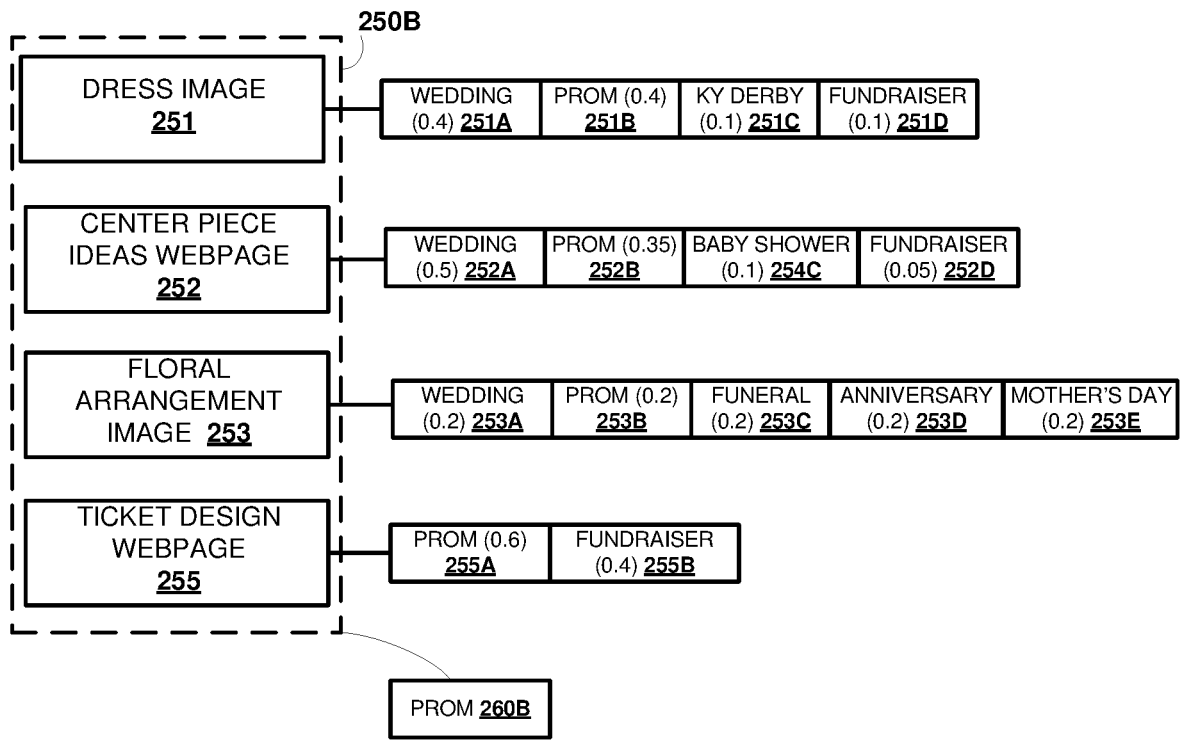
FIG. 2B1
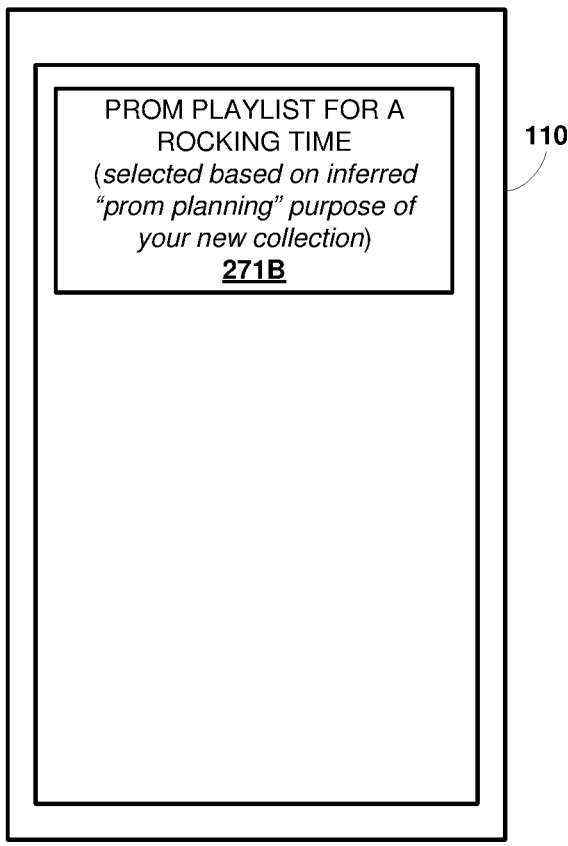
FIG. 2B2

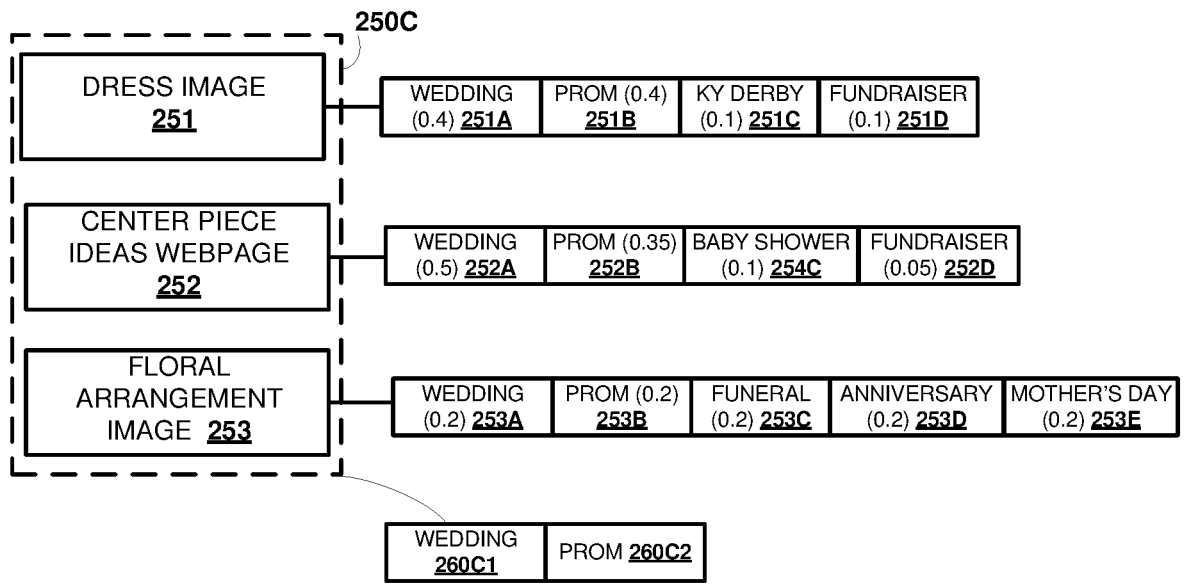
FIG. 2C1
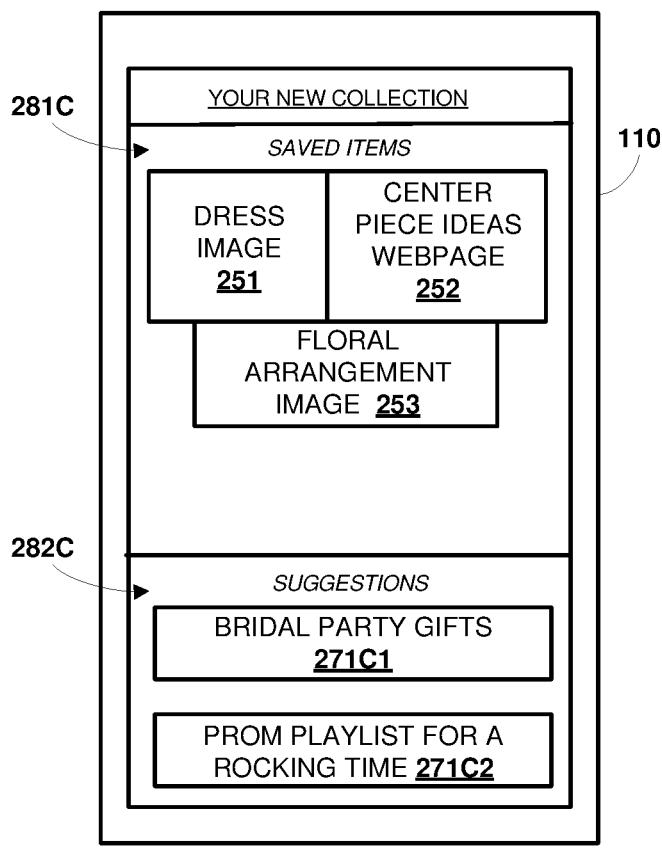
FIG. 2C2

DETERMINING AND UTILIZING ACTUAL PURPOSE OF USER-ASSEMBLED COLLECTION OF ELECTRONIC CONTENT ITEMS

BACKGROUND

Various techniques have been proposed for determining relevant content items for a user, and presenting those relevant content items as suggestions to the user. One example is item-based collaborative filtering, in which a given content item can be presented to a user as a suggestion. The given content item can be presented as a suggestion based on the user having interacted with a particular content item, and based on having determined that a threshold percentage of other users who interacted with the particular content item also interacted with the given content item.

However, item-based collaborative filtering techniques and/or other techniques can have one or more drawbacks. For example, such techniques can ignore an underlying intent or purpose of a user in interacting with a particular content item. This can lead to waste of computer and/or network resources in presenting a given content item that, while having a determined association with the particular content item, is inconsistent with the underlying purpose of the user in interacting with the particular content item. In other words, while such techniques can present a given content item that has content similarity with the particular content item, the given content item can be inconsistent with the underlying purpose of the user in interacting with the particular content item. For instance, assume a user interacted with a webpage of the United States Patent and Trademark Office (USPTO) with the purpose of learning to prepare and file a trademark application. Current techniques can result in a given content item being presented to the user that is solely focused on filing patent applications (without any focus on preparing and filing trademark applications). This can be the result of a large percentage of other users who visited the USPTO webpage also visiting the given content item. However, since the given content item (patent focused) is inconsistent with the user's purpose (preparing and filing a trademark application), transmission and presentation of the given content item wastes network and computational resources.

SUMMARY

Implementations disclosed herein are directed to determining, based on a user-assembled collection of electronic content items, at least one actual purpose (also referred to herein as "intent") for the assembled collection. Those implementations are further directed to selecting an additional electronic content item based on the at least one actual purpose being assigned to the additional electronic content item in an electronic database. Those implementations are yet further directed to, responsive to the selecting, causing a suggestion for the additional electronic content item to be rendered at a client device associated with a user account that is assigned to the user-assembled collection. Electronic content items can include, for example, images, webpages, selected subset(s) of webpages (e.g., snippet(s) of text, image(s)), portable document format (PDF) documents, word processing documents, videos, audio files, and/or other discrete electronic content items.

In some implementations, an electronic content item of the collection can be added to the collection responsive to one or more user interface inputs that explicitly request the electronic content item be added to the collection. For example, when viewing an electronic content item a user can long-press, right-click, or select a toolbar button to be presented with a menu that includes an option to add the electronic content item to a collection. In some of those implementations, the menu (or other interface) enables the user to select, from a plurality of available collections, a particular collection to which to add the electronic content item (or to define a new collection, and optionally a name for the new collection). In some additional or alternative implementations, user interface input(s) can request an electronic content item be added to a collection, without specifying the particular collection to which to add the electronic content item. In some of those implementations, a plurality of electronic content items can be automatically added to a particular collection, without user interface input(s) explicitly specifying the particular collection (e.g., rather, just specifying a request to add to any collection). For example, a plurality of electronic content items can be automatically added to a particular collection based on requests for those electronic content items being received in close temporal proximity to one another (e.g., within five minutes or other threshold) and/or based on the electronic content item(s) sharing one or more corresponding purpose(s).

In determining an actual purpose for a user-assembled collection of electronic content items, corresponding candidate purpose(s) (and optionally corresponding measures) for each of the electronic content items of the collection are considered. For example, assume a user-assembled collection that consists of four separate electronic content items. The first electronic content item of the collection can have candidate purposes of A, B, and C, with corresponding probability measures of 0.5, 0.4, and 0.1. The second electronic content item of the collection can have candidate purposes of A, B, D, and E with corresponding probability measures of 0.3, 0.25, 0.25, and 0.2. The third electronic content item of the collection can have candidate purposes of A, B, and F with corresponding probability measures of 0.33, 0.33, and 0.33. The fourth electronic content item of the collection can have candidate purposes of A and C, with corresponding probability measures of 0.5 and 0.5.

In such an example, candidate purpose A can be determined to be an actual purpose for the collection. This can be based on, for example, candidate purpose A being a corresponding purpose for each of the electronic content items of the collection and/or based on its corresponding probability measure for each of the electronic content items. For example, based on each of the corresponding probability measures for candidate purpose A satisfying a threshold and/or based on an average or other combination of the corresponding probability measures satisfying a threshold. Contrast this with an alternate example with the same first, second, and third electronic content items, but with a different fourth electronic content item. The different fourth electronic content item in the collection in the alternate example can have candidate purposes of B and C (instead of A and C), with corresponding probability measures of 0.5 and 0.5. In such an alternate example, candidate purpose B can instead be determined to be an actual purpose for the collection. Thus, despite the collection having the same first, second, and third content items in the primary and alternate examples, different actual purposes are determined for the collection in the alternate examples—as a result of the different fourth electronic content item in the two examples.

Continuing with the primary example, in response to determining candidate purpose A is an actual purpose for the collection, an additional electronic content item can be selected. The additional electronic content item can be selected, from a corpus of additional electronic content items, based on the candidate purpose A being assigned to the additional electronic content item (optionally with a threshold probability measure or other measure) in an electronic database. Optionally, in selecting the additional electronic content item from the corpus, various additional electronic content items can be filtered from the selection based on those lacking any assignment to candidate purpose A and/or lacking at least a threshold measure for an assignment to candidate purpose A. This can make the selecting more resource efficient through reduction of the quantity of additional content items considered. This can additionally prevent selection of certain additional content items that may have a strong collaborative filtering relationship to electronic content item(s) of the collection, but lack any assignment (or assignment with low measure) to candidate purpose A. One or more other factors can also be considered in selecting the additional electronic content item, such as overall popularity of the additional electronic content item, a collaborative filtering relationship of the additional electronic content item to electronic content item(s) of the collection, and/or other factor(s).

Further, in response to selecting the additional content item, a suggestion for the additional electronic content item can be caused to be rendered at a client device associated with a user account assigned to the collection. The suggestion can include all or portions of (e.g., a snippet of) the additional content item. Optionally, the suggestion is selectable to cause the additional electronic content item to be rendered (in its entirety) at the client device and/or to cause the additional electronic content item to be added to the collection.

In some implementations, the suggestion can be presented with a descriptor that indicates the suggestion is being rendered based on relation of the suggestion to the determined actual purpose. For example, the descriptor can be "Being shown since this and your collection both relate to purpose A". In some of those implementations, the descriptor, or a related descriptor element, can be selectable to enable the user to confirm the determined purpose of the collection and/or to define an alternate candidate purpose. For example, a related descriptor element can be provided that includes a "confirmation" element that, when selected, confirms the determined purpose of the collection and/or can include an "adjust" element that, when selected, presents the user with one or more of the other considered candidate purposes. Any one of those alternate candidate purposes can then be selected to alter the purpose assigned to the collection. Accordingly, the descriptor can provide a corresponding user with insight as to why the suggestion was selected and/or as to the inferred actual purpose for the collection. Further, the descriptor or associated element can be selected to alter the inferred actual purpose when it is inconsistent with the user's intent. Yet further, the descriptor or associated element can additionally or alternatively be selected to confirm the actual purpose, which can result in an increase in a quantity of additional suggestions relevant to the actual purpose that are provided, and/or can result in explicitly automatically modifying a title or metadata of the collection to reflect the actual purpose (obviating user input to do so).

It is noted that the additional electronic content item can be selected in lieu of an alternate additional electronic content item that might have a strong correlation, via collaborative filtering and/or other prior techniques, to electronic content item(s) of the collection. This can be due to the candidate purpose A not being assigned to the alternate additional content item, or not being assigned to the alternate additional content item with at least a threshold measure. For example, as described above the alternate additional electronic content item can be actively filtered out from the selection based on lacking any defined assignment to candidate purpose A. Accordingly, although the alternate candidate electronic content item may be one that is frequently interacted with following interaction with one or more of the electronic content items of the collection, it can be prevented from being presented, according to implementations disclosed herein, based on it lacking assignment to an actual purpose of the collection. In these and other manners, suggestions for electronic content item(s) that are not related to the actual purpose are prevented from being wastefully generated (e.g., at a server), transmitted (e.g., from a server to the client device), rendered (e.g., at the client device), and/or interacted with (e.g., at the client device). This directly leads to conserving server-side resources, client-side resources, and/or network resources.

Moreover, generating suggestions for additional electronic content items, determined to be assigned to a purpose of the collection, can reduce a quantity of user interface inputs required by a corresponding user to interact with additional content that conforms to the purpose of the collection. For example, a suggestion for an additional content item can be generated and proactively presented or "pushed" to the user proactively, e.g., as a notification "card" or "tile", and quickly interacted with by a user to quickly view the additional content item and/or quickly add the additional content item to the collection. This can be more user input efficient than, for example, the user instead issuing multiple searches and/or browsing to identify the additional content item.

Further, a determined purpose of a collection can be utilized in other technique(s) in addition to or instead of using the determined purpose in generating suggestions that are "pushed" proactively for presentation at a client device. For example, in some implementations determined purpose(s) for collection(s) of a user account can be persisted in memory (e.g., at one or more client devices associated with the user account and/or in the cloud) for future use. The future use can include, for example, use in ranking search results responsive to user submitted search queries (e.g., to bias toward search result(s) assigned the purpose(s)), use in ranking autocomplete suggestions for partial user queries (e.g., to bias toward autocomplete suggestions assigned to the purpose(s)), and/or other user(s). This can result in relevant search result(s) and/or autocomplete suggestion(s) being presented more prominently, leading to quicker user selection and decreasing a duration of user interaction to identify the search result(s) and/or autocomplete suggestion(s).

In various implementations, purpose(s) determined based on user-assembled collection(s) can be more indicative of the user's interest than purpose(s) determined based on electronic content item(s) that are merely viewed or otherwise interacted with by the user in isolation, without assigning those electronic content item(s) to a collection. Further, when an electronic content item has multiple candidate purposes and is interacted with without being assigned as part of a collection, the actual purpose of the user for interacting with the electronic content item may not be resolvable. Thus, implementations disclosed herein leverage user-assembled collections to determine purpose(s) that are highly likely to be relevant to a user, enabling tailoring of further provided content to those purpose(s) and improving the user experience.

As used herein, a "candidate purpose" or "candidate intent" of an electronic content item defines one or more global actions to which the electronic content item can relate. For example, for a content item that is a webpage describing circuit breakers, candidate purposes can include "resetting a tripped circuit breaker", "installing a new circuit breaker", and "installing a new electrical panel". As another example, for a content item that is an image of a dress, candidate purposes can include "wedding planning", "prom planning", "attending a charitable event", and "attending the Kentucky Derby". While candidate purpose(s) of an electronic content item can be determined based at least in part on entities, terms, and/or other content included in the electronic content item, the candidate purpose(s) are not themselves descriptors of the content included in the electronic content item and are not descriptors of classification(s) of the content included in the electronic content item. Rather, each candidate purpose defines higher-level (global) action(s) for which the electronic content item can be used in accomplishing, optionally in combination with other content items. In many implementations, one or more candidate purposes of a content item can be mutually exclusive, relative to other candidate purposes (e.g., a subset or all other) of the content item. In many implementations, one or more candidate purposes of a content item are not directly mentioned in content (e.g., text) of the content item.

Various techniques can be utilized to determine candidate purpose(s) for a content item. For example, in determining candidate purpose(s) for a content item an electronic database can be accessed that has defined assignments of content items (and/or original sources of the content items) to corresponding purpose. Candidate purpose(s) can be assigned, in the electronic database, to a given content item based at least in part on (or exclusively on) analysis of incoming links to the given content item (and/or similar content items), other content item(s) interacted with in close temporal proximity to interactions with the given content item (and/or similar content items), and/or based on defined relationship(s) between content of the content item (e.g., classification(s) of the content) and the candidate purpose(s). As one example, a candidate purpose of "wedding planning" can be assigned to a webpage related to centerpieces despite that webpage not including the term "wedding", "wedding planning", or any other content explicitly identifying "wedding planning". For instance, the candidate purpose can be assigned to the webpage based on anchor text of incoming link(s) including "wedding", "wedding planning" and/or other terms. Also, for instance, the candidate purpose of "wedding planning" can be assigned to the webpage additionally or alternatively based on historical interactions of a plurality of users indicating a large quantify of occurrences of those users visiting "wedding planning" content before and/or after visiting the webpage, and optionally within a threshold duration of visiting the webpage. As yet another instance, the candidate purpose of "wedding planning" can be assigned to the webpage based on users previously assigning the webpage to collections that are manually labeled, by the users, with an actual purpose of "wedding planning".

In some implementations, a probability measure and/or other measure assigned to a candidate purpose, for a content item, can be based on a determined relevance of that candidate purpose, for the content item, relative to other candidate purposes. For example, assume a content item is associated with a candidate purpose of "wedding planning" based on anchor text of N incoming links referencing "wedding planning" and is associated with a candidate purpose of "prom planning" based on anchor text of M links referencing "prom planning"—where N and M are both integers, and N is greater than M. In such an example, the probability measure for "wedding planning" can be greater based at least in part on "wedding planning" being referenced in anchor text of a greater quantity of incoming links than is "prom planning".

In some implementations, probability measures for candidate purposes, for a content item, are the same for each of a plurality of users, despite those users arriving at the content item in different manners and/or interacting with the content item in different manners. In some other implementations, the probability measures can be dynamically adapted to a user in dependence on precursor action(s) in navigating to the content item and/or in dependence on interaction with the content item. For example, assume user A navigated to the content item responsive to a search that included the term "wedding" but did not include "prom" and user B navigated to the content item responsive to a search that included the term "prom" but did not include "wedding". In such an example, the measure for a "wedding planning" candidate purpose for the content item can be promoted for user A (based on inclusion of "wedding" in the search), while the measure for a "prom planning" candidate purpose for the content item can instead be promoted for user B (based on inclusion of "prom" in the search). As another example, assume user A emailed a link to the content item to a friend and included the term "wedding" in the subject, without including the term "prom". In such an example, the measure for a "wedding planning" candidate purpose for the content item can be promoted for user A based on inclusion of the term "wedding" in the subject of the email that included the link to the content item.

In some implementations, multiple potential actual purposes can be determined for a collection, where the potential actual purposes are still a subset of all candidate purposes for the electronic content items of the collection. For example, assume a user-assembled collection that consists of three separate electronic content items. The first electronic content item of the collection can have candidate purposes of A, B, and C, with corresponding probability measures of 0.5, 0.4, and 0.1. The second electronic content item of the collection can have candidate purposes of A, B, D, and E with corresponding probability measures of 0.3, 0.25, 0.25, and 0.2. The third electronic content item of the collection can have candidate purposes of A, B, and F with corresponding probability measures of 0.33, 0.33, and 0.33.

In such an example, candidate purpose A and candidate purpose B can both be determined to be potential actual purposes for the collection. This can be based on, for example, candidate purposes A and B both being a corresponding purpose for each of the electronic content items of the collection and/or based on their corresponding probability measure for each of the electronic content items. Further, in such an example, content items can be selected based on candidate purpose A and/or candidate purpose B being assigned to those content items, and suggestions presented based on such content item(s).

Yet further, when two or more potential purposes are identified for a collection, some implementations seek to resolve a single actual purpose from the two or more potential purposes. In some implementations, this includes explicitly prompting the user to choose one or more of the potential purposes as actual purpose(s). In some other implementations, this includes selecting, for each of the potential purposes, a content item that is assigned to that potential purpose without being assigned to any other of the potential purposes. Further, a corresponding suggestion can be caused to be rendered for each of the content items. An affirmative user interface input (e.g., a selection to view and/or a selection to add to the collection) directed to a given suggestion can be used to determine its assigned potential purpose is an actual purpose for the collection. Additionally or alternatively, a negative user interface input (e.g., swiping away or otherwise dismissing) directed to a given suggestion can be used to determine its assigned potential purpose is not an actual purpose. Thereafter, suggestions can be provided that are tailored to actual purpose(s) that are confirmed for the collection. Presenting the user with multiple suggestions, each tailored to a different potential purpose for the collection, and determining actual purpose(s) for the collection based on user interaction(s) with the suggestions, enables the user to quickly interact with at least one suggestion that is relevant to his/her purpose, while also obtaining feedback (from the user's interaction) that enables resolution of a correct actual purpose. This can be more resource efficient and require less user inputs than, for example, separately explicitly prompting the user to choose one or more of the potential purposes as actual purpose(s).

The above description is provided as an overview of only some implementations disclosed herein. Those implementations, and other implementations, are described in additional detail herein.

Various implementations can include a non-transitory computer readable storage medium storing instructions executable by a processor to perform a method such as one or more of the methods described herein. Yet other various implementations can include a system including memory and one or more hardware processors operable to execute instructions, stored in the memory, to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2A1 illustrates an example of a user-assembled collection, corresponding candidate purposes and probability measures for electronic content items for the collection, and a determined actual purpose for the user-assembled collection.

FIG. 2A2 illustrates an example of rendering suggestions for additional content items selected based on assignment of the determined actual purpose, of FIG. 2A1, to the additional content items.

FIG. 2B1 illustrates another example of a user-assembled collection, corresponding candidate purposes and probability measures for electronic content items for the collection, and a determined actual purpose for the user-assembled collection.

FIG. 2B2 illustrates an example of rendering a suggestion for an additional content item selected based on assignment of the determined actual purpose, of FIG. 2B1, to the additional content item.

FIG. 2C1 illustrates another example of a user-assembled collection, corresponding candidate purposes and probability measures for electronic content items for the collection, and determined potential actual purposes for the user-assembled collection.

FIG. 2C2 illustrates an example of rendering suggestions for additional content items each selected based on assignment of one of the determined potential actual purposes, of FIG. 2C1, to the additional content item, without assignment of the other potential actual propose, of FIG. 2C1, to the additional content item.

DETAILED DESCRIPTION

Figure 1A:
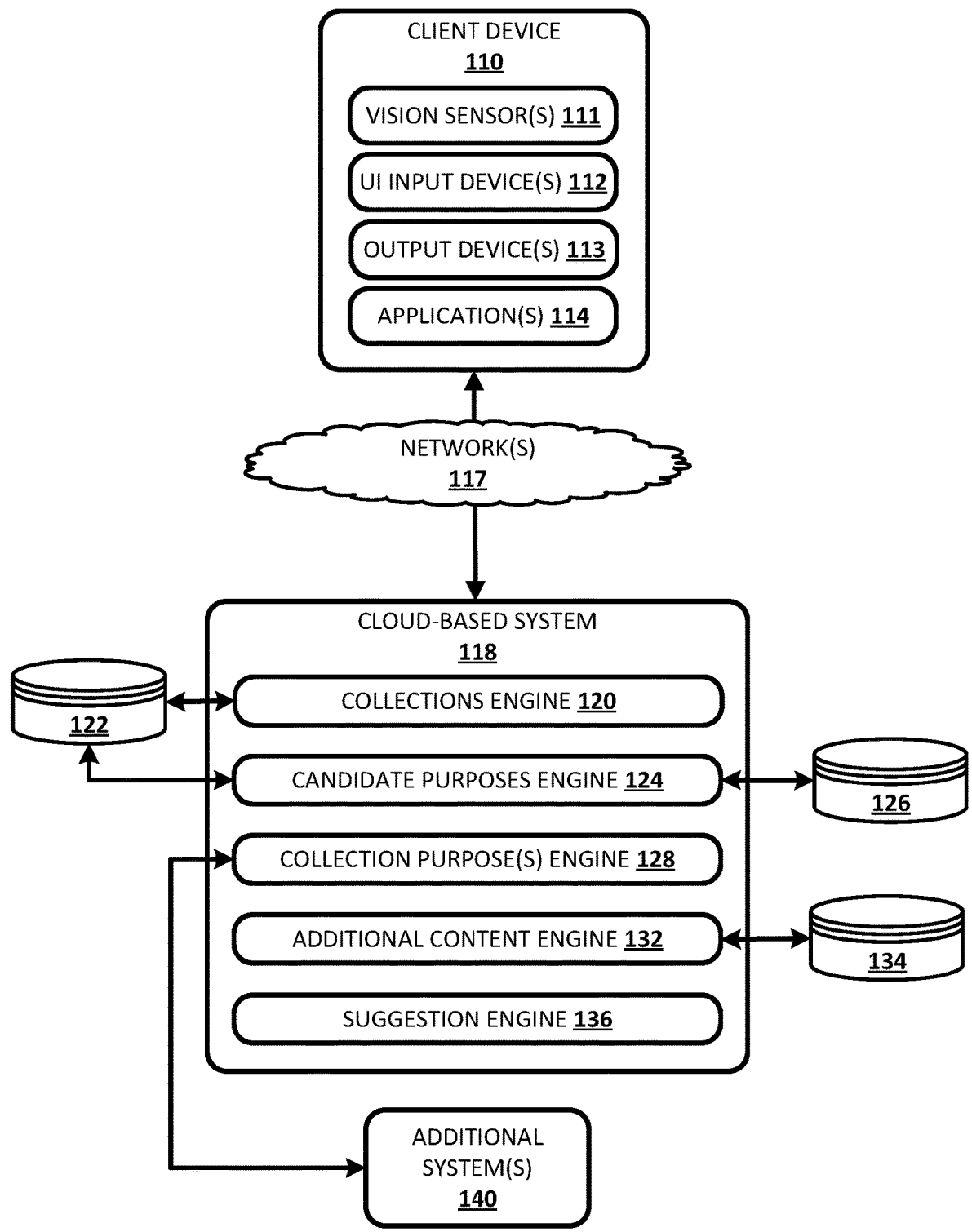
FIG. 1A illustrates an example environment in which implementations disclosed herein can be implemented.

FIG. 1A illustrates an example environment in which implementations disclosed herein can be implemented. The example environment includes a client device 110 and a cloud-based system 118. Cloud-based system 118 can be implemented in one or more computers that communicate, for example, through a network (not depicted). Cloud-based system 118 is one example of a system in which techniques described herein may be implemented and/or with which systems, components, and techniques described herein may interface. Although various components are illustrated and described as being implemented by cloud-based system 118, one or more components can additionally or alternatively be implemented (in whole or in part) on client device 110.

A user can interact with cloud-based system 118 via client device 110. Other computer devices may communicate with cloud-based system 118, including but not limited to additional client device(s) of the user, additional client devices of other users and/or one or more servers implementing a service that has partnered with the provider of cloud-based system 118. For brevity, however, the examples are described in the context of client device 110.

Client device 110 is in communication with cloud-based system 118 through a network such as a local area network (LAN) or wide area network (WAN) such as the Internet (one or more such networks indicated generally at 117). Client device 110 can be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (optionally with display) that operates a voice-interactive personal digital assistant (also referred to as an "automated assistant"), or a wearable apparatus of the user that includes a computing device (e.g., a watch of the user having a computing device, glasses of the user having a computing device, a wearable music player). Additional and/or alternative client devices can be provided.

Client device 110 can include various software and/or hardware components. For example, in FIG. 1, client device 110 includes vision sensor(s) 111, user interface (UI) input device(s) 112, and output device(s) 113. Vision sensor(s) 111 can take various forms, such as a digital camera, a passive infrared ("PIR") sensor, an RGBd sensor, a stereoscopic camera, and/or other vision sensor(s). Vision sensor 111 can be operated, e.g., by a user (not depicted), to capture one or more digital images, e.g., as standalone digital images and/or as a sequence of digital image frames that form a digital video. An image or video captured via vision sensor 111 can optionally be a content item that is added to a collection associated with a user account of the client device 110. UI input device(s) 112 can include, for example, microphone(s), a touchscreen, a keyboard (physical or virtual), a mouse, and/or other UI input device(s). Output device(s) 113 can include, for example, a touchscreen or other display, speaker(s), and/or other output device(s).

Client device 110 can also execute various software. For example, in the implementation depicted in FIG. 1, client device 110 executes one or more application(s) 114. The application(s) 114 can include, for example, an automated assistant application, a web browser, a messaging application, etc. One or more of the application(s) 114 can at least selectively interface with the cloud-based system 118 in, for example, assigning content items to collections, viewing or modifying collections, and/or receiving and/or rendering suggestions that are based on determined actual purposes of collections. For example, a web browser and/or automated assistant application of the application(s) 114 can be utilized in interfacing with the cloud-based system 118. As another example, the application(s) 114 can include a collections application that is devoted to interactions with the cloud-based system 118.

Through interactions with one or more of the application(s) 114, a user of the client device 110 can add various electronic content items to various collections that are associated with a user account of the user and that are managed by collections engine 120 of cloud-based system 118. Collections engine 120 interfaces with collections database 122 to store, in the collections database 122, associations of electronic content items to corresponding collections of a user account associated with client device 110. Collections engine 120 can further retrieve, from collections database 122, stored collections of the user account to enable presentation of corresponding electronic content of the collections at the client device 110.

Access to collections, of collections database 122 that are associated with a user account, can be restricted to client devices that are associated with the user account (e.g., those client device(s) logged-in to the user account) and/or to one or more other user-accounts that have been explicitly authorized via the user-account. In other words, access can be restricted to a particular user, and optionally to one or more other users that have been explicitly authorized by the user.

Some non-limiting examples of a user of the client device 110 adding electronic content items to a collection are now provided. As one example, when viewing a webpage via one of the application(s) 114 of client device 110, the user can long-press, right-click, or select a toolbar button to be presented with a menu that includes an option to add the webpage to a collection. The menu can optionally present a plurality of collections, previously defined for a user account associated with the user, and user interface input can be directed to one of the collections to add the webpage to that collection. The menu can additionally or alternatively enable the user to define a new collection for the user account, and/or can enable the electronic content item be added to a collection, without specifying the particular collection to which to add the electronic content item. In response to user interface input(s) requesting addition of the webpage to a collection, the collections engine 120 can add the webpage to the collection in collections database 122. Adding the webpage to a collection can include storing, in collections database 122, at least an association of a uniform resource locator (URL) (or other identifier of the webpage) to the collection. Optionally, all or portions of content of the webpage can additionally or alternatively be stored, in collections database 122, in association with the collection.

As another example, when viewing a webpage a user can long-press, right-click, or otherwise interact with an image of the webpage to be presented with a menu that includes an option to add the image to a collection. In response to user interface input(s) requesting addition of the image to a collection, the collections engine 120 can add the image to the collection in collections database 122. Adding the image to a collection can include storing, in collections database 122, at least an association of a URL (or other identifier of the image) to the collection. Optionally, all or portions of the image can additionally or alternatively be stored, in collections database 122, in association with the collection. As yet another example, a user can add an image, captured by one of the vision sensor(s) 111, to a collection. For example, the image can be added by drag-and-drop (dropping into an area associated with the collection), long-pressing, right-clicking, or otherwise interacting with the image. As yet a further example, a user can add a snippet of text from a webpage to a collection by copying the text and pasting it into the collection.

In some implementations, a plurality of electronic content items can be automatically added to a particular collection, without user interface input(s) explicitly specifying the particular collection (e.g., rather, just specifying a request to add to any collection). For example, a plurality of electronic content items can be automatically added to a particular collection based on requests for those electronic content items being received in close temporal proximity to one another (e.g., within five minutes or other threshold) and/or based on the electronic content item(s) sharing one or more corresponding candidate purpose(s).

Candidate purposes engine 124, of cloud-based system 118, can access collections database 122 to determine, for each of a plurality of collections, candidate purpose(s) for each electronic content item of the collection. In determining candidate purpose(s) for an electronic content item, the candidate purposes engine 124 can utilize candidate purposes database 126 and/or other resource. For example, the candidate purposes database 126 can store associations of publicly accessible documents to corresponding candidate purposes, optionally with corresponding probability measures (or other measures) for the corresponding candidate purposes. Accordingly, where the electronic content item is a publicly accessible document, or is derived from a publicly accessible document (e.g., an image from the document, a snippet of text from the document), the candidate purposes engine 128 can utilize the candidate purposes database 126 to determine candidate purpose(s) that are assigned to that publicly accessible document—and assign such candidate purpose(s) as the candidate purposes for the electronic content item.

As another example, the candidate purposes database 126 can additionally or alternatively store associations of object classification(s), term(s), and/or other content to corresponding purpose(s), optionally with corresponding probability measures (or other measures) for the corresponding candidate purposes. For example, a "dress" object classification and/or the term "dress" can be assigned to candidate purposes such as "wedding", "prom", "Kentucky Derby", "Fundraiser", etc. The candidate purpose(s) engine 124 can process an electronic content item can be processed to determine object classification(s) and/or term(s) included in the electronic content item. Further, the candidate purpose(s) engine 124 can access candidate purposes database 126 to determine candidate purpose(s) assigned to those object classification(s) and/or term(s)—and assign such candidate purpose(s) as the candidate purposes for the electronic content item. For instance, if the electronic content item is an image, the candidate purposes engine 124 can process the image, using one or more machine learning models, to determine classification(s) of object(s) included in the image. Further, the candidate purposes engine 124 can access candidate purposes database 126 to determine candidate purpose(s) assigned to the classification(s) (and optionally corresponding measure(s)), and assign such candidate purpose(s) (and optionally corresponding measure(s)) to the image.

The collection purpose(s) engine 128 determines actual purpose(s) for collections. In determining an actual purpose for a user-assembled collection of electronic content items, the collection purpose(s) engine 128 can consider the corresponding candidate purpose(s) (and optionally corresponding measures) for each of the electronic content items of the collection, as determined by candidate purposes engine 124. For example, assume a collection that consists of three separate electronic content items. The first electronic content item of the collection can have candidate purposes of A, B, and C, with corresponding probability measures of 0.5, 0.4, and 0.1. The second electronic content item of the collection can have candidate purposes of A, B, D, and E with corresponding probability measures of 0.3, 0.25, 0.25, and 0.2. The third electronic content item of the collection can have candidate purposes of A and C, with corresponding probability measures of 0.5 and 0.5. In such an example, collection purpose(s) engine 128 can determine candidate purpose A to be an actual purpose for the collection. This can be based on, for example, candidate purpose A being a corresponding purpose for each of the electronic content items of the collection and/or based on its corresponding probability measure for each of the electronic content items.

The additional content engine 132 selects, for a given user account, additional content item(s) based on actual purpose(s) determined (by collection purpose(s) engine 128) for collection(s) of the user account. For example, the additional content engine 132 can select, form a corpus 134 of available electronic content items, an additional electronic content item based on a determined actual purpose of a collection being assigned to the additional electronic content item (optionally with a threshold probability measure or other measure) in an electronic database (e.g., candidate purposes database 126). The additional electronic content item can be, for example, a webpage, an audio file, an image, a video, and/or other content item. The corpus 134 can include, for example, various publicly accessible documents. Optionally, in selecting additional electronic content item(s) for a user account, additional content engine 132 filters various additional electronic content items from the selection based on those lacking any assignment to determined actual purpose(s) of collection(s) of the user account, and/or lacking at least a threshold measure for an assignment to the actual purpose(s). Additional content engine 132 can optionally utilize one or more other factors in selecting additional electronic content items, such as overall popularity of the additional electronic content items, a collaborative filtering relationship of the additional electronic content items to electronic content item(s) of the collection(s), and/or other factor(s).

The suggestion engine 136 generates suggestions based on additional content items selected by the additional content engine 132. Further, the suggestion engine 136 can transmit the suggestions to the client device 110 to cause them to be rendered via one or more of the application(s) 114 of the client device 110. In some implementations or situations, the suggestion engine 136 pushes the suggestion proactively to the client device 110. This pushing can optionally be responsive to an access, via the client device 110, of a corresponding collection and/or responsive to other parameter-free inputs at the client device 110. A suggestion generated by the suggestion engine 136 can include all or portions of (e.g., a snippet of) the additional content item. Optionally, a suggestion generated by the suggestion engine 136 can include selectable element(s). For example, the suggestion can include a selectable element that, when selected, causes the additional electronic content item to be rendered (in its entirety) at the client device 110. As another example, the suggestion can additionally or alternatively include a selectable element that, when selected, causes the additional electronic content item to be added to the collection with which the suggestion is associated (i.e., the collection with the determined actual purpose based on which the suggestion was generated). In some implementations, the suggestion engine 136 includes, as part of the suggestion, a descriptor that indicates the suggestion is being rendered based on relation of the suggestion to a corresponding determined actual purpose of a collection. In some of those implementations, the descriptor, or a related descriptor element, can be selectable to enable the user to confirm the determined actual purpose of the collection and/or to define an alternate actual purpose.

As described herein, in some implementation or situations, the collection purpose(s) engine 128 determines multiple potential actual purposes for a collection. The determined potential actual purposes can optionally still be a subset of all candidate purposes for the electronic content items of the collection. In some of those implementations or situations, additional content engine 132 selects, for each of the potential purposes, a content item that is assigned to that potential purpose without being assigned to any other of the potential purposes (or being assigned with a measure that fails to satisfy a threshold). Further, the suggestion engine 128 generates a corresponding suggestion for each of the content items, and causes all of the suggestions to be rendered at the client device 110 (optionally simultaneously). Further, suggestion engine 136 and/or other engine can monitor user interface input(s) directed to the presented suggestions, and use the user interface input(s) to resolve a single actual purpose for the collection. This resolved single actual purpose can be conveyed to collections engine 120 to enable explicitly assigning (e.g., in a title and/or in other metadata) that actual purpose to the collection in the collections database 122. Additionally or alternatively, the resolved single actual purpose can be conveyed to the collection purpose(s) engine 128 and/or additional content engine 132 so that actual purpose is thereafter utilized for the collection in determining additional electronic content items. As one example, an affirmative user interface input directed to a given suggestion can be used to determine its corresponding potential actual purpose is an actual purpose for the collection and/or a negative user interface input directed to a given suggestion can be used to determine its corresponding potential actual purpose is not an actual purpose.

Additional system(s) 140 are also illustrated in FIG. 1A in communication with at least collection purposes engine 128. The additional system(s) 140 can include, for example, a search system, an autocomplete suggestion system, and/or other systems. In some implementations, and with explicit user permission, the collection purpose(s) engine 128 can provide the additional system(s) 140 with determined actual purpose(s) for a user account. The additional system(s) 140 can then utilize the actual purpose(s) in tailoring information provided to client device(s) associated with the user account (e.g., responsive to requests from those client device(s)).

Figure 1B:
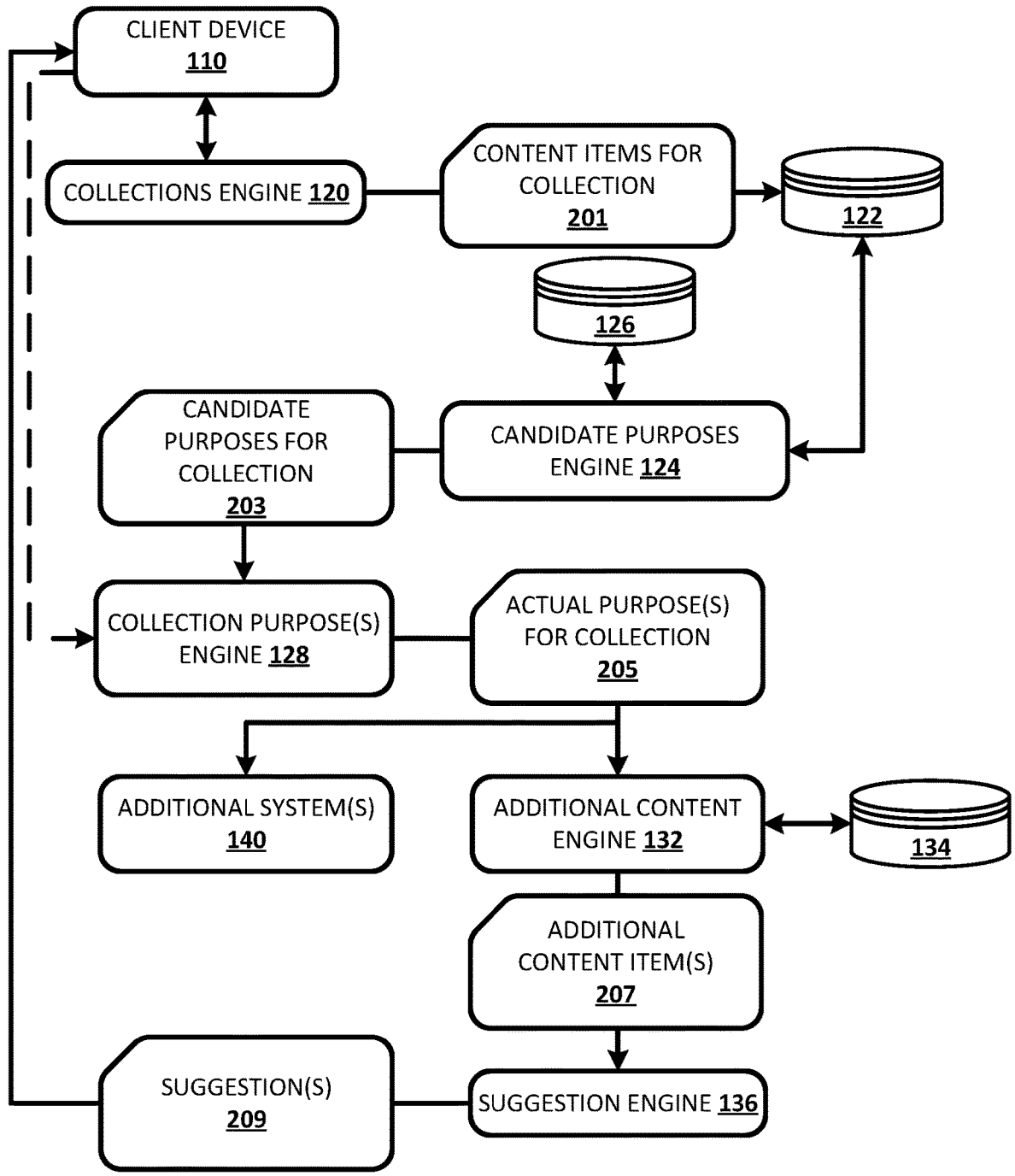
FIG. 1B depicts an example process flow that demonstrates some implementations of how various components of FIG. 1A can interact.

Turning now to FIG. 1B, an example process flow is illustrated that demonstrates some implementations of how various components of FIG. 1A can interact. In FIG. 1B, client device 110 interacts with collections engine 120 to add electronic content items for collection 201, to a collection of the collections database 122. The collection can be associated, in the collections database 122, with a user account of the client device 110, and can be access-restricted to that user account.

The candidate purposes engine 124 can access collections database 122 to determine, for the collection, candidate purpose(s) for each electronic content item of the collection 203. In determining the candidate purpose(s) for the electronic content items of the collection, the candidate purposes engine 124 can utilize candidate purposes database 126 and/or other resource(s).

The collection purpose(s) engine 128 analyzes the candidate purposes for the collection 203, to determine one or more actual purposes for the collection 205. For example, the collection purpose(s) engine 128 can determine a single actual purpose, or multiple potential actual purposes. The actual purpose(s) for the collection 205 can be provided to additional content engine 132 and/or to additional system(s) 140.

The additional content engine 132 selects, from corpus and based on the actual purpose(s) for the collection 205, one or more additional content items 207. For example, the additional content engine 132 can select an additional content item based on at least one of the actual purpose(s) being assigned to the additional content item.

The additional content item(s) 207 are provided to the suggestion engine 136, which generates suggestion(s) 209 based on the additional content item(s) 207. The suggestion(s) 209 are transmitted to the client device 110 for graphical and/or audible rendering by the client device 110. In some implementations, user interaction(s) with the suggestion(s) 209 can be transmitted to the collections engine 120. For example, the user interaction(s) can include user interface input(s) to add the additional content item of a suggestion to the collection, which can be transmitted to the collections engine 120 to add the additional content item to the collection in the collections database 122. Also, for example, the suggestion(s) can include a first suggestion tailored to a first potential actual purpose and a second suggestion tailored to a second potential actual purpose, and the interaction(s) can be user interface input(s) that affirm the first suggestion and/or dismiss the second suggestion. Such interaction(s) can be conveyed to the collection purpose(s) engine 128 to enable the collection purpose(s) engine 128 to correspondingly adjust the potential actual purposes for the collection.

FIG. 2A1 illustrates an example of a user-assembled collection 250A that includes electronic content items 251, 252, 253, and 254. For example, electronic content items 251-254 can be added to the collection 250A through corresponding instances of user interface input provided at the client device 110 (FIGS. 1A and 1B), and can be stored in collections database 122 (FIGS. 1A and 1B) by collections engine 120 (FIGS. 1A and 1B).

Electronic content item 251 is an image of a dress and has determined candidate purposes of wedding 251A, prom 251B, Kentucky Derby 251C, and fundraiser 251D. Further, the candidate purposes 251A-D have corresponding probability measures indicated by parentheticals (i.e., wedding 252A has a probability measure of 0.4 for electronic content item 252). Electronic content item 252 is a webpage focused on center piece ideas and has determined candidate purposes of wedding 252A, prom 252B, baby shower 252C, and fundraiser 252D. Further, the candidate purposes 252A-D have corresponding probability measures indicated by parentheticals (i.e., wedding 252A has a probability measure of 0.5 for electronic content item 252). Electronic content item 253 is an image of a floral arrangement and has determined candidate purposes of wedding 253A, prom 253B, funeral 253C, anniversary 253D, and mother's day 253E. Further, the candidate purposes 253A-E have corresponding probability measures indicated by parentheticals (i.e., wedding 253A has a probability measure of 0.2 for electronic content item 253). Electronic content item 254 is a webpage focused on cakes created by Jane Doe and has determined candidate purposes of wedding 254A, birthday 254B, and baby shower 254C. Further, the candidate purposes 254A-C have corresponding probability measures indicated by parentheticals (i.e., wedding 254A has a probability measure of 0.6 for electronic content item 254). The candidate purposes illustrated in FIG. 2A1 can be determined by candidate purposes engine 124, optionally utilizing candidate purposes database 126 and/or other resource(s).

Also illustrated in FIG. 2A1 is a determined actual purpose of wedding 260A that has been determined for the collection 250A. For example, the actual purpose of wedding 260A can be determined (e.g., by collection purpose(s) engine 128) based on wedding being a candidate purpose for each of the electronic content items 251-254 (as indicated by candidate purposes 251A, 252A, 253A, and 254A). Also, for example, the actual purpose of wedding 260A can additionally or alternatively be determined based on an average or cumulative measure of the probabilities for wedding being greater than the average or cumulative measure of the probabilities for any other candidate purposes. For example, in FIG. 2A1 the average probability measure for wedding is 0.425 and the cumulative measure for wedding is 1.7, both of which are greater than the average or cumulative measure of the probabilities for any other candidate purposes in FIG. 2A1.

FIG. 2A2 illustrates an example of rendering suggestions 271A1 and 271A2 for additional content items selected based on assignment of the determined actual purpose wedding 260A, of FIG. 2A1, to the additional content items. In FIG. 2A2, client device 110 is illustrated displaying a graphical interface that is rendering, in saved items portion 281, indications of the content items 251-254 that are part of the collection 250A. The indications of the content items 251-254 are rendered under the heading "Saved Items" to indicate that those are already part of the collection 250A, and the super-heading "Your New Collection" indicates to the user that the graphical interface relates the user's new (and yet unnamed) collection 250A.

The suggestions 271A1 and 271A2 are rendered in suggestions portion 282A. Suggestion 271A1 is for a corresponding webpage that is directed to local wedding venues, and that can be selected (e.g., by additional content engine 132) based on an assignment of the determined actual wedding purpose (of collection 250A) to that webpage. Suggestion 271A2 is for another corresponding webpage that is directed to gifts for a bridal party (e.g., bridesmaids and/or groomsmen), and that can be selected based on an assignment of the determined actual wedding purpose to that webpage.

Suggestion 271A1 can be interacted with (e.g., tapped) to cause the client device 110 to navigate to a corresponding content item and/or can be interacted with (e.g., drag-and-drop into saved portion 281A) to add the suggestion 271A1 to the collection 250A. Suggestion 271A2 can also be interacted with in a similar manner. The suggestions 271A1 and 271A2 are rendered under the heading "Suggestions—based on inferred "wedding" purpose" to indicate that those suggestions are being rendered based on the inferred actual purpose of "wedding" 260A for the collection 250A. Further, a selectable "confirm" option is provided that, when selected, can optionally automatically alter the title of the collection 250A (e.g., to include the term "wedding") and/or to increase a quantity and/or frequency of further suggestions related to the wedding purpose. Yet further, a selectable "alter" option is provided that, when selected, can optionally present other candidate purpose(s) of FIG. 2A1 (e.g., "prom") to enable the user to select one of the presented other candidate purpose(s) to change the actual purpose of the collection 250A to the selected other candidate purpose. This can result in further suggestions being directed to the alternate selected other candidate purpose and/or automatically altering the tile of the collection 250A based on the selected other candidate purpose.

FIG. 2B1 is an alternate to FIG. 2A1 and illustrates another example of a user-assembled collection 250B that includes the electronic content items 251, 252, and 253 of collection 250A (FIG. 2A1). However, collection 250B includes electronic content item 255 instead of electronic content item 254. Electronic content item 255 is webpage directed to ticket design and has determined candidate purposes of prom 255B with a probability measure of 0.6 and fundraiser 255B with a probability measure of 0.4.

Also illustrated in FIG. 2B1 is a determined actual purpose of prom 260B that has been determined for the collection 250B, and that is notably different from the actual purpose of wedding 260A determined for the collection 250A of FIG. 2A1. For example, the actual purpose of prom 260B can be determined (e.g., by collection purpose(s) engine 128) based on prom being a candidate purpose for each of the electronic content items 251, 252, 253, and 255 (as indicated by candidate purposes 251B, 252B, 253B, and 255A). Also, for example, the actual purpose of prom 260B can additionally or alternatively be determined based on an average or cumulative measure of the probabilities for prom being greater than the average or cumulative measure of the probabilities for any other candidate purposes. For example, in FIG. 2B1 the average probability measure for prom is 0.3875 and the cumulative measure for wedding is 1.55, both of which are greater than the average or cumulative measure of the probabilities for any other candidate purposes in FIG. 2B1.

FIG. 2B2 illustrates an example of rendering a suggestion 271B for an additional content item selected based on assignment of the determined actual purpose prom 260B, of FIG. 2B1, to the additional content item. In FIG. 2B2, client device 110 is illustrated displaying the suggestion 271B as a "card" that can be rendered as an operating system notification, or in another interface. Suggestion 271B can alternatively be rendered in an interface similar to that of FIG. 2A2, but the interface of FIG. 2B2 is illustrated as another example of rendering suggestion(s).

The suggestion 271B is for a corresponding webpage that is directed to a suggested prom song playlist and that can be selected (e.g., by additional content engine 132) based on an assignment of the determined actual prom purpose (of collection 250B) to that webpage. Suggestion 271B can be interacted with (e.g., tapped) to cause the client device 110 to navigate to a corresponding content item and/or can be interacted with (e.g., long-tap to present a menu) to add the suggestion 271B to the collection 250B. The suggestion 271B is rendered with the text "selected based on inferred 'prom planning' purpose of your new collection" to indicate that suggestion 271B is being rendered based on the inferred actual purpose of prom 260B for the collection 250B.

FIG. 2C1 is an alternate to FIGS. 2A1 and 2B1 and illustrates another example of a user-assembled collection 250C that includes the electronic content items 251, 252, and 253 of collections 250A (FIG. 2A1) and 250B (FIG. 2A2), but does not include the electronic content item 254 of collection 250A or the electronic content item 255 of collection 250B.

Also illustrated in FIG. 2C1 are the determined potential actual purposes of wedding 260C1 and prom 260C2 that have been determined for the collection 250C. For example, the two potential actual purposes can be determined (e.g., by collection purpose(s) engine 128) based on prom and wedding each being a candidate purpose for each of the electronic content items 251, 252, 253. Also, for example, the two potential actual purposes of prom and wedding can additionally or alternatively be determined based on average or cumulative measures of those purposes being within a threshold of one another and/or satisfying another threshold. For example, in FIG. 2C1 the cumulative measure for prom is 0.95 and the cumulative measure of wedding is 1.1, and both can be selected based on those cumulative measures being within a threshold of one another and/or being statistically meaningfully greater than measures for other candidate purposes.

FIG. 2C2 illustrates an example of rendering a suggestion 271C1 for an additional content item selected based on having an assignment to the determined potential actual purpose of wedding 260C1, but not having an assignment (or having an assignment with less than a threshold measure) to the determined potential actual purpose of prom 260C2. Further, in FIG. 2C2, a suggestion 271C2 is rendered for another additional content item selected based on having an assignment to the determined potential actual purpose of prom 260C2, but not having an assignment (or having an assignment with less than a threshold measure) to the determined potential actual purpose of wedding 260C1. As described herein, an affirmative interaction with one of the two suggestions can optionally be utilized to determine its corresponding potential actual purpose is the actual purpose of the collection 250C. That actual purpose can then optionally be used (to the exclusion of the other potential actual purpose) in determining further suggestions, in titling the collection 250C, and/or for other purpose(s). For example, an affirmative interaction with suggestion 271C1 can include interacting with suggestion 271C1 to view the corresponding webpage, or dragging-and-dropping the suggestion 271C1 into the suggestion portion 281C of the graphical interface. Additionally or alternatively, a negative interaction with one of the two suggestions can optionally be utilized to determine its corresponding potential actual purpose is not the actual purpose (and/or that the other potential actual purpose is the actual purpose). For example, a negative interaction with suggestion 271C1 can include swiping away or otherwise dismissing the suggestion 271C1.

Figure 3:
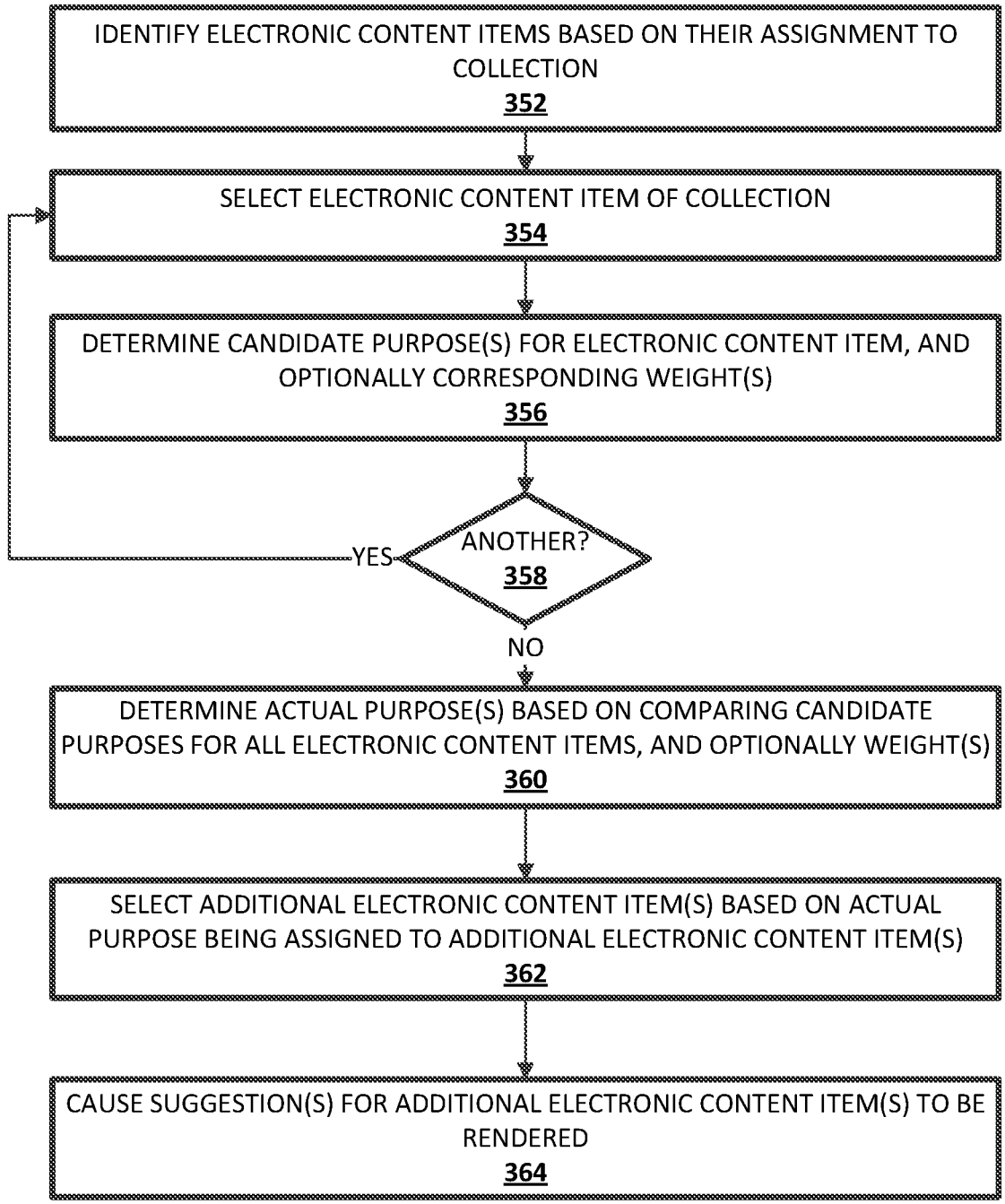
FIG. 3 depicts a flow chart illustrating an example method of performing aspects of the present disclosure.

Referring now to FIG. 3, an example method 300 for implementing selected aspects of the present disclosure is described. For convenience, the operations of the flow chart are described with reference to a system that performs the operations. This system may include various components of various computer systems. For instance, operations may be performed at the client device 110 and/or at the cloud-based system 118. Moreover, while operations of method 300 are shown in a particular order, this is not meant to be limiting. One or more operations may be reordered, omitted or added.

At block 352, the system identifies electronic content items based on their assignment to a collection. In some implementations, an electronic content item of the collection can be added to the collection responsive to one or more user interface inputs that explicitly request the electronic content item be added to the collection.

At block 354, the system selects an electronic content item of the collection.

At block 356, the system determines candidate purpose(s) for the electronic content item, and optionally corresponding weight(s) for the candidate purpose(s).

At block 358, the system determines whether there is another unprocessed electronic content item in the collection. If so, the system performs blocks 354 and 356 for the unprocessed electronic content item. If not, the system proceeds to block 360.

At block 360, the system determines actual purpose(s), for the collection, based on comparing the candidate purposes for all electronic content items of the collection, and optionally based on their weight(s). For example, the system can select an actual purpose based on it being a corresponding purpose for each of the electronic content items of the collection and/or based on measures for the actual purpose satisfying one or more thresholds.

At block 362, the system selects additional electronic content item(s) (i.e., in addition to those included in the collection) based on an actual purpose (of the actual purpose(s) determined at block 360) being assigned to the additional electronic content item(s). In some implementations, in selecting the additional electronic content item, the system filters out various additional electronic content items based on those lacking any assignment to the actual purpose(s) for the collection and/or lacking at least a threshold measure for an assignment to the actual purpose(s).

At block 364, the system causes suggestion(s), for the additional electronic content items selected at block 362, to be rendered at a client device of a user account associated with the collection. The suggestion can include all or portions of (e.g., a snippet of) the additional content item. Optionally, the suggestion is selectable to cause the additional electronic content item to be rendered (in its entirety) at the client device and/or to cause the additional electronic content item to be added to the collection.

Figure 4:
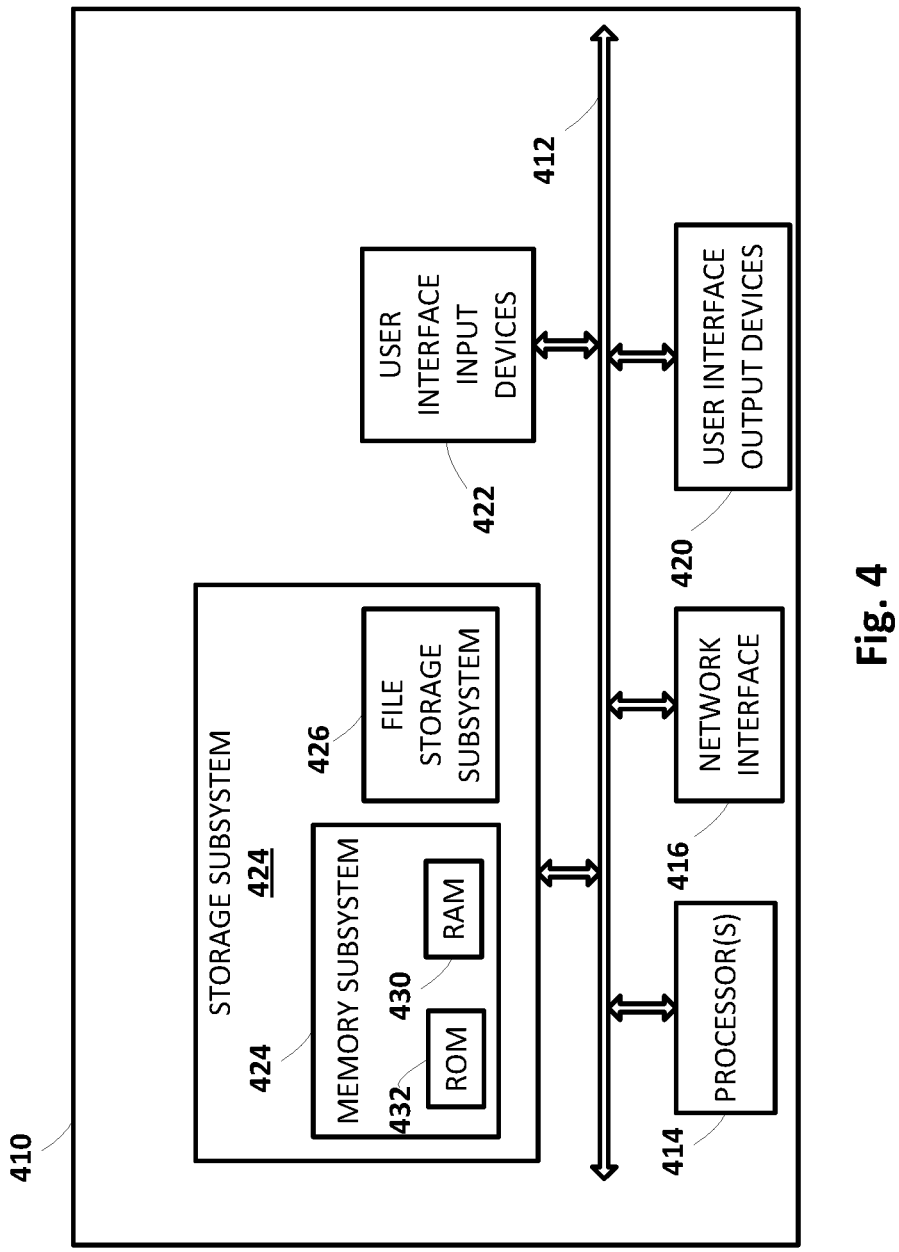
FIG. 4 schematically depicts an example architecture of a computer system.

FIG. 4 is a block diagram of an example computer system 410. Computer system 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of methods described herein.

These software modules are generally executed by processor 414 alone or in combination with other processors. Memory 425 used in the storage subsystem can include a number of memories including a main random access memory (RAM) 440 for storage of instructions and data during program execution and a read only memory (ROM) 442 in which fixed instructions are stored. A file storage subsystem 424 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 424 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method is provided that includes identifying electronic content items based on the electronic content items having each been assigned to a particular collection of a user account. Each of the electronic content items was assigned to the particular collection responsive to a corresponding instance of one or more user interface inputs provided by a user of the user account. The method further includes determining, for each of the electronic content items, corresponding candidate purposes for the electronic content item. Each of the corresponding candidate purposes for each of the electronic content items defines one or more global actions to which the electronic content item can relate. The method further includes comparing the corresponding candidate purposes, for all of the electronic content items of the particular collection, to determine that a particular candidate purpose, of the corresponding candidate purposes, is an actual purpose for the particular collection. The method further includes selecting a given additional electronic content item from a corpus of additional content items. Selecting the given additional electronic content item is based on the actual purpose, for the particular collection, being assigned to the given additional electronic content item in an electronic database. The method further includes, responsive to selecting the given additional content item, causing a suggestion, for the given additional electronic content item, to be rendered at a client device associated with the user account. The suggestion is selectable to cause the given additional electronic content item to be rendered at the client device and/or to add the additional electronic content item to the particular collection.

These and other implementations of the technology disclosed herein can optionally include one or more of the following features.

In some implementations, comparing the corresponding candidate purposes, for all of the electronic content items of the particular collection, to determine that the particular candidate purpose is the actual purpose for the particular collection includes determining that the particular candidate purpose is the actual purpose based on the particular candidate purpose being determined to be one of the corresponding candidate purposes for each of the electronic content items of the particular collection. In some versions of those implementations, the method further includes determining, for each of the electronic content items, a corresponding measure for each of the corresponding candidate purposes for the electronic content item. In some of those versions, each of the corresponding measures indicates a rank of a corresponding one of the candidate purposes, relative to other of the corresponding candidate purposes, for the electronic content item. Further, in some of those versions, determining that the particular purpose is the actual purpose is further based on the corresponding measures determined for the particular candidate purpose for each of the electronic content items of the particular collection. Yet further, in some of those versions, the method further includes: identifying one or more precursor actions that are temporally related to adding a particular electronic content item, of the electronic content items, to the particular collection; and determining the corresponding measures for the particular electronic content item based on correspondence between the one or more precursor actions and the corresponding candidate purposes for the particular electronic content item. The one or more precursor actions were performed prior to adding the particular electronic content item to the particular collection.

In some implementations, the method further includes determining, for each of the electronic content items of the particular collection, a corresponding measure for each of the corresponding candidate purposes for the electronic content item. Each of the corresponding measures indicates a rank of a corresponding one of the candidate purposes, relative to other of the corresponding candidate purposes, for the electronic content item. In those implementations, comparing the corresponding candidate purposes, for all of the electronic content items of the collection, to determine that the particular candidate purpose is the actual purpose for the particular collection includes: determining that the particular candidate purpose is the actual purpose based on the corresponding measures determined for the particular candidate purpose for each of the electronic content items. In some versions of those implementations, the method further includes identifying one or more precursor actions that are temporally related to adding a particular electronic content item, of the electronic content items, to the particular collection. In those versions, the one or more precursor actions were performed prior to adding the particular electronic content item to the particular collection, and determining the corresponding measures for the particular electronic content item is based on correspondence between the one or more precursor actions and the corresponding candidate purposes for the particular electronic content item.

In some implementations, selecting the given additional electronic content item from the corpus of additional content items is further based on a particular measure, for the actual purpose, that is assigned to the given additional electronic content item in the electronic database. The particular measure indicates a rank of the actual purpose for the electronic content item.

In some implementations, the method further includes, responsive to selecting the given additional electronic content item based on the particular purpose being assigned to the given additional content item: causing the suggestion to be rendered at the client device along with a descriptor of the particular purpose. The descriptor of the particular purpose indicates the suggestion is being rendered based on relation of the suggestion to the particular purpose and based on relation of the particular collection to the particular purpose. In some versions of those implementations, the method further includes causing the descriptor, or the related descriptor element, to be selectable at the client device. In some of those versions, selection of the selectable descriptor or related descriptor element causes a confidence measure, of the particular purpose for the particular collection, to be promoted. In some other versions of those implementations, selection of the selectable descriptor or the related descriptor element causes presentation of an interface that enables replacing the particular purpose with another one of the candidate purposes for the particular collection.

In some implementations, determining, for each of the electronic content items, the corresponding candidate purposes for the electronic content item includes determining the corresponding candidate purposes based on the corresponding candidate purposes being assigned to the electronic content item in the electronic database.

In some implementations, the particular collection lacks any user inputted descriptor that has a defined relationship to the particular purpose.

In some implementations, causing the suggestion to be rendered at the client device associated with the user account includes causing the suggestion to be rendered at the client device when the particular collection is being rendered at the client device.

In some implementations, a particular content item, of the content items of the particular collection, is an image. In some of those implementations, determining the corresponding candidate purposes for the image includes: processing the image, using one or more machine learning models, to predict one or more classifications of one or more objects captured in the image; and determining the corresponding candidate purposes for the image based on the corresponding candidate purposes each being mapped to one or more of the classifications.

In some implementations, a method is provided that includes identifying electronic content items based on the electronic content items having each been assigned to a particular collection of a user account. The method further includes determining, for each of the electronic content items, corresponding candidate purposes and corresponding measures for the electronic content item. Each of the corresponding candidate purposes for each of the electronic content items defines one or more global actions to which the electronic content item can relate. Each of the corresponding measures defines a corresponding strength of correlation, of one of the corresponding candidate purposes, to the electronic content item. The method further includes comparing the corresponding candidate purposes, for all of the electronic content items of the collection, to determine: a first purpose and a second purpose, of the corresponding candidate purposes. Determining the first purpose is based on a first quantity of occurrences, of the first purpose, amongst the corresponding candidate purposes of the electronic content items and/or is based on first magnitudes of the corresponding measures for the first purpose. Determining the second purpose is based on a second quantity of occurrences, of the second purpose amongst the corresponding candidate purposes of the electronic content items and/or is based on second magnitudes of the corresponding measures for the second purpose. The method further includes selecting a first additional electronic content item from a corpus of additional content items. Selecting the first additional electronic content item is based on an electronic database defining an association of the first purpose to the first additional electronic content item without defining an association of the second purpose to the first additional content item. The method further includes selecting a second additional electronic content item from a corpus of additional content items. Selecting the second additional electronic content item is based on an electronic database defining an association of the second purpose to the second additional electronic content item without defining an association of the first purpose to the first additional content item. The method further includes, responsive to selecting the first additional electronic content item and the second additional content item: causing a first suggestion, for the first additional content item, to be rendered at a client device associated with the user account, and causing a second suggestion, for the second additional content item, to be rendered at the client device. The method further includes selecting either the first purpose or the second purpose as an actual purpose, of the particular collection, based on one or more user interface inputs received responsive to the rendering of both the first suggestion and the second suggestion.

These and other implementations of the technology disclosed herein can optionally include one or more of the following features.

In some implementations, selecting either the first purpose or the second purpose as the actual purpose includes selecting the first purpose based on: an affirmative user interface input, of the one or more user interface inputs, that is directed to the first suggestion, and/or a negative user interface input, of the one or more user interface inputs, that is directed to the second suggestion. In some versions of those implementations, the method further includes, subsequent to selecting the first purpose selecting a further additional content item, from the corpus of additional content items, based on selecting the first purpose and based on the first purpose being assigned, in the electronic database, to the further additional content item. Further, those versions further include causing a further suggestion, related to the further additional content item, to be presented at the client device or an additional client device associated with the user account.

In some implementations, the particular collection lacks any user inputted descriptor that has a defined relationship to the particular purpose.

In some implementations, causing the first suggestion to be rendered and the second suggestion to be rendered includes causing the first suggestion and the second suggestion to be rendered simultaneously at the client device.

In some implementations, causing the first suggestion and the second suggestion to be rendered simultaneously at the client device includes causing the first suggestion and the second suggestion to be rendered at the client device when the particular collection is being rendered at the client device.

What is claimed is:

1. A method implemented by one or more processors, the method comprising:
   identifying electronic content items based on the electronic content items having each been assigned to a particular collection of a user account, wherein each of the electronic content items was assigned to the particular collection responsive to a corresponding instance of one or more user interface inputs provided by a user of the user account;
   determining, for each of the electronic content items, corresponding candidate purposes for the electronic content item, wherein each of the corresponding candidate purposes for each of the electronic content items defines one or more global actions to which the electronic content item can relate;
   identifying one or more precursor actions that are temporally related to adding a particular electronic content item, of the electronic content items, to the particular collection, wherein the one or more precursor actions were performed prior to adding the particular electronic content item to the particular collection;
   determining, for each of the electronic content items of the particular collection, a corresponding measure for each of the corresponding candidate purposes for the electronic content item,
      wherein each of the corresponding measures indicates a rank of a corresponding one of the candidate purposes, relative to other of the corresponding candidate purposes, for the electronic content item, and
      wherein determining the corresponding measures for the particular electronic content item is based on correspondence between the one or more precursor actions and the corresponding candidate purposes for the particular electronic content item;

comparing the corresponding candidate purposes, for all of the electronic content items of the particular collection, to determine that a particular candidate purpose, of the corresponding candidate purposes, is an actual purpose for the particular collection wherein the comparing comprises:
    determining that the particular candidate purpose is the actual purpose based on the corresponding measures determined for the particular candidate purpose for each of the electronic content items;
selecting a given additional electronic content item from a corpus of additional content items, wherein selecting the given additional electronic content item is based on the actual purpose, for the particular collection, being assigned to the given additional electronic content item in an electronic database; and
responsive to selecting the given additional content item:
    causing a suggestion, for the given additional electronic content item, to be rendered at a client device associated with the user account,
        wherein the suggestion is selectable to cause the given additional electronic content item to be rendered at the client device and/or to add the additional electronic content item to the particular collection.

2. The method of claim 1, wherein comparing the corresponding candidate purposes, for all of the electronic content items of the particular collection, to determine that the particular candidate purpose is the actual purpose for the particular collection further comprises:
    determining that the particular candidate purpose is the actual purpose based on the particular candidate purpose being determined to be one of the corresponding candidate purposes for each of the electronic content items of the particular collection.

3. The method of claim 1,
wherein selecting the given additional electronic content item from the corpus of additional content items is further based on a particular measure, for the actual purpose, that is assigned to the given additional electronic content item in the electronic database, wherein the particular measure indicates a rank of the actual purpose for the given additional electronic content item.

4. The method of claim 1, further comprising:
responsive to selecting the given additional electronic content item based on the particular purpose being assigned to the given additional content item:
    causing the suggestion to be rendered at the client device along with a descriptor, of the particular purpose, that indicates the suggestion is being rendered based on relation of the suggestion to the particular purpose and based on relation of the particular collection to the particular purpose.

5. The method of claim 4, further comprising:
causing the descriptor, or the related descriptor element, to be selectable at the client device;
wherein selection of the selectable descriptor or related descriptor element causes a confidence measure, of the particular purpose for the particular collection, to be promoted.

6. The method of claim 4, further comprising:
causing the descriptor, or a related descriptor element, to be selectable at the client device;
wherein selection of the selectable descriptor or the related descriptor element causes presentation of an interface that enables replacing the particular purpose with another one of the candidate purposes for the particular collection.

7. The method of claim 1, wherein determining, for each of the electronic content items, the corresponding candidate purposes for the electronic content item comprises:
    determining the corresponding candidate purposes based on the corresponding candidate purposes being assigned to the electronic content item in the electronic database.

8. The method of claim 1, wherein the particular collection lacks any user inputted descriptor that has a defined relationship to the particular purpose.

9. The method of claim 1, wherein causing the suggestion to be rendered at the client device associated with the user account comprises causing the suggestion to be rendered at the client device when the particular collection is being rendered at the client device.

10. The method of claim 1, wherein a particular content item, of the content items of the particular collection, is an image, and wherein determining the corresponding candidate purposes for the image comprises:
    processing the image, using one or more machine learning models, to predict one or more classifications of one or more objects captured in the image; and
    determining the corresponding candidate purposes for the image based on the corresponding candidate purposes each being mapped to one or more of the classifications.

11. The method of claim 1, wherein the one or more precursor actions include a precursor search and/or a precursor email.

12. The method of claim 11, wherein determining the corresponding measures for the particular electronic content item based on correspondence between the one or more precursor actions and the corresponding candidate purposes for the particular electronic content item comprises:
    determining the corresponding measures based on correspondence between at least one term, included in the precursor search and/or the precursor email, and the corresponding candidate purposes for the particular electronic content item.

13. A method implemented by one or more processors, the method comprising:
    identifying electronic content items based on the electronic content items having each been assigned to a particular collection of a user account;
    determining, for each of the electronic content items, corresponding candidate purposes and corresponding measures for the electronic content item,
        wherein each of the corresponding candidate purposes for each of the electronic content items defines one or more global actions to which the electronic content item can relate and
        wherein each of the corresponding measures defines a corresponding strength of correlation, of one of the corresponding candidate purposes, to the electronic content item and is based on a quantity of incoming links, to the electronic content item, that include corresponding anchor text that references the one of the corresponding candidate purposes;
    comparing the corresponding candidate purposes, for all of the electronic content items of the collection, to determine:
        a first purpose, of the corresponding candidate purposes, based on a first quantity of occurrences of the first purpose amongst the corresponding candidate purposes of the electronic content items and/or based on first magnitudes of the corresponding measures for the first purpose, and a second purpose, of the corresponding candidate purposes, based on a second quantity of occurrences of the second purpose amongst the corresponding candidate purposes of the electronic content items and/or based on second magnitudes of the corresponding measures for the second purpose;

selecting a first additional electronic content item from a corpus of additional content items, wherein selecting the first additional electronic content item is based on an electronic database defining an association of the first purpose to the first additional electronic content item without defining an association of the second purpose to the first additional content item;

selecting a second additional electronic content item from a corpus of additional content items, wherein selecting the second additional electronic content item is based on an electronic database defining an association of the second purpose to the second additional electronic content item without defining an association of the first purpose to the second additional content item; and responsive to selecting the first additional electronic content item and the second additional content item:

causing a first suggestion, for the first additional content item, to be rendered at a client device associated with the user account, and causing a second suggestion, for the second additional content item, to be rendered at the client device; and selecting either the first purpose or the second purpose as an actual purpose, of the particular collection, based on one or more user interface inputs received responsive to the rendering of both the first suggestion and the second suggestion.

14. The method of claim 13, wherein selecting either the first purpose or the second purpose as the actual purpose, of the particular collection, based on the one or more user interface inputs received responsive to the rendering of both the first suggestion and the second suggestion, comprises:

selecting the first purpose based on:

an affirmative user interface input, of the one or more user interface inputs, that is directed to the first suggestion, and/or a negative user interface input, of the one or more user interface inputs, that is directed to the second suggestion.

15. The method of claim 14, further comprising, subsequent to selecting the first purpose:

selecting a further additional content item, from the corpus of additional content items, based on selecting the first purpose and based on the first purpose being assigned, in the electronic database, to the further additional content item; and causing a further suggestion, related to the further additional content item, to be presented at the client device or an additional client device associated with the user account.

16. The method of claim 13, wherein the particular collection lacks any user inputted descriptor that has a defined relationship to the particular purpose.

17. The method of claim 13, wherein causing the first suggestion to be rendered and the second suggestion to be rendered comprises causing the first suggestion and the second suggestion to be rendered simultaneously at the client device.

18. The method of claim 17, where causing the first suggestion and the second suggestion to be rendered simultaneously at the client device comprises causing the first suggestion and the second suggestion to be rendered at the client device when the particular collection is being rendered at the client device.

* * * * *